United States Patent
Granitz et al.

[11] Patent Number: 5,990,573
[45] Date of Patent: Nov. 23, 1999

[54] POWER AND SIGNAL DISTRIBUTION FOR AUTOMOTIVE ELECTRONICS USING AREA AND FEATURE MODULES

[75] Inventors: Richard Francis Granitz, Harrisburg; Andrew Michael Hunt, Elizabethtown; Lang Thanh Le, Camp Hill; Aern Evert Rider, deceased, late of Hanover, all of Pa., by Sandra Louis Rider, executrix

[73] Assignee: The Whitaker Corporation, Wilmington, Del.

[21] Appl. No.: 09/018,808

[22] Filed: Feb. 4, 1998

[51] Int. Cl.⁶ ................................................ B60L 1/00
[52] U.S. Cl. ............................... 307/10.1; 307/18
[58] Field of Search ........................ 307/9.1–10.6, 307/147, 31, 18, 34, 29, 38, 42, 52; 701/1, 29, 36, 45, 49; 70/264; 318/466, 446; 361/601, 602, 622, 624, 627, 637, 641, 648, 679; 174/68.1, 68.2, 71 R, 72 A, 72 B, 71 B; 370/475

[56] References Cited

U.S. PATENT DOCUMENTS

| | | |
|---|---|---|
| 4,293,947 | 10/1981 | Brittain . |
| 4,794,269 | 12/1988 | Kawata et al. ................. 307/10.1 |
| 4,887,263 | 12/1989 | Steely ............................ 307/10.1 |
| 5,044,964 | 9/1991 | Minerd et al. . |
| 5,334,926 | 8/1994 | Imaizui . |
| 5,394,400 | 2/1995 | Phoy ............................... 370/475 |

FOREIGN PATENT DOCUMENTS

| | | |
|---|---|---|
| 0 325 205 A2 | 7/1989 | European Pat. Off. . |
| 2 626 116 | 7/1989 | France . |

OTHER PUBLICATIONS

Patent Abstracts of Japan, vol. 008, No. 064 (M–285), Mar. 27, 1984 & JP 58 214440 A (Nissan Jidosha KK), Dec. 13, 1983.

International Search Report, Applicant's file reference 18649 PCT, International Application No., PCT/US 98/01722, International filing date Jan. 28, 1998.

*Primary Examiner*—Richard T. Elms

[57] ABSTRACT

The invention is directed to an electrical distribution system for an automobile having a power distribution bus and a signal distribution bus. An area module has an electrical connection with the power distribution bus and the signal distribution bus. The area module has connections to individual feature modules. The feature modules have power and signal distribution for electrical components. The area and the feature modules distribute power and signal to the electrical components from the power distribution bus and the signal distribution bus.

14 Claims, 10 Drawing Sheets

POWER AND SIGNAL DISTRIBUTION FOR AUTOMOTIVE ELECTRONICS USING AREA AND FEATURE MODULES

FIELD OF THE INVENTION

The invention is related to a power and signal distribution system and a common set of interconnection components which can be used in various numbers and arrangements to provide the power and control signal distribution network in any model or size of vehicle.

BACKGROUND OF THE INVENTION

Conventionally, vehicles, such as automobiles, include an electrical power distribution system which has a central fuse box from which a number of power conductors radiate. Fuses are provided in the fuse box to provide overload protection for individual power conductors. The fuse box is conventionally mounted either near the instrument panel or in the engine compartment of the vehicle. From the fuse box, wires extend to all electrical components within the automobile. This creates a massive complex of wires extending throughout the whole automobile.

There is an increasing interest in providing a less complicated wiring system for the automobile. By providing a less complicated system, it would be much easier for individual electrical problems to be isolated and also would eliminate the spaghetti-like distribution of electrical wires throughout the automobile.

SUMMARY OF THE INVENTION

The invention is directed to an electrical distribution system for an automobile having a power distribution bus and a signal distribution bus. An area module has an electrical connection with the power distribution bus and the signal distribution bus. The area module has connections to individual feature modules. The feature modules have power and signal distribution for electrical components. The area and the feature modules distribute power and signal to the electrical components from the power distribution bus and the signal distribution bus.

The invention is further directed to an electrical distribution system for a vehicle having an electrical component, a power distribution bus, and a signal distribution bus. An area module has an electrical tap to the power distribution bus and to the signal distribution bus. The area module distributes a signal to and from the signal distribution bus to the electrical component and distributes power to the electrical component in response to a signal.

The invention is further directed to an electrical distribution system for an automobile having a signal distribution network with a backbone and a plurality of taps. A power distribution network has a backbone and a plurality of taps. A plurality of area modules are connected to the taps on both the signal distribution network and the power distribution network for receiving signal and power. Each of the area modules provides and receives signal to and from various electrical components within the vicinity of each of the area modules. Each of the area modules provides power to the various electrical components based on the signals received

BRIEF DESCRIPTION OF THE DRAWINGS

Embodiments of the present invention will now be described by way of example with reference to the accompanying drawings, in which.

DETAILED DESCRIPTION OF THE INVENTION

The system is composed of two or more "area" modules located at strategic locations in the vehicle body and interconnected in daisy chain fashion via signal bus (network bus) conductors. The form of these conductors can vary depending on the signaling protocol used. These "area" modules are essentially identical in form and function. One or more "feature" modules are plugged into the "area" modules using a suitable connector system. The form of all "feature" modules is essentially identical. The function of the "feature" modules is determined by the vehicle feature that it will control and the location of "area" module into which it is plugged. Suitable cables run between the input devices (switches, sensors etc.) and (or) output devices (motors, solenoids, lamps)and the "feature" module.

The system uses a dual voltage power distribution bus. To reduce conductor wire gauge, a higher voltage is used for loads requiring substantial power (i.e. 100 watts). These loads are controlled directly from the high voltage bus via a semiconductor switch (SPD-smart power device)located at the load. The lower voltage bus is used mainly for low power loads such as small lamps, solenoids and relays and controls power to these loads via a semiconductor switch located in the "feature" module. The low voltage bus also supplies power to the "area" modules and to the "feature" modules via a low voltage bus within the "area" module.

While the preferred embodiment of the invention includes a dual voltage system, the invention can also be practiced using a single voltage system.

Figure 1:
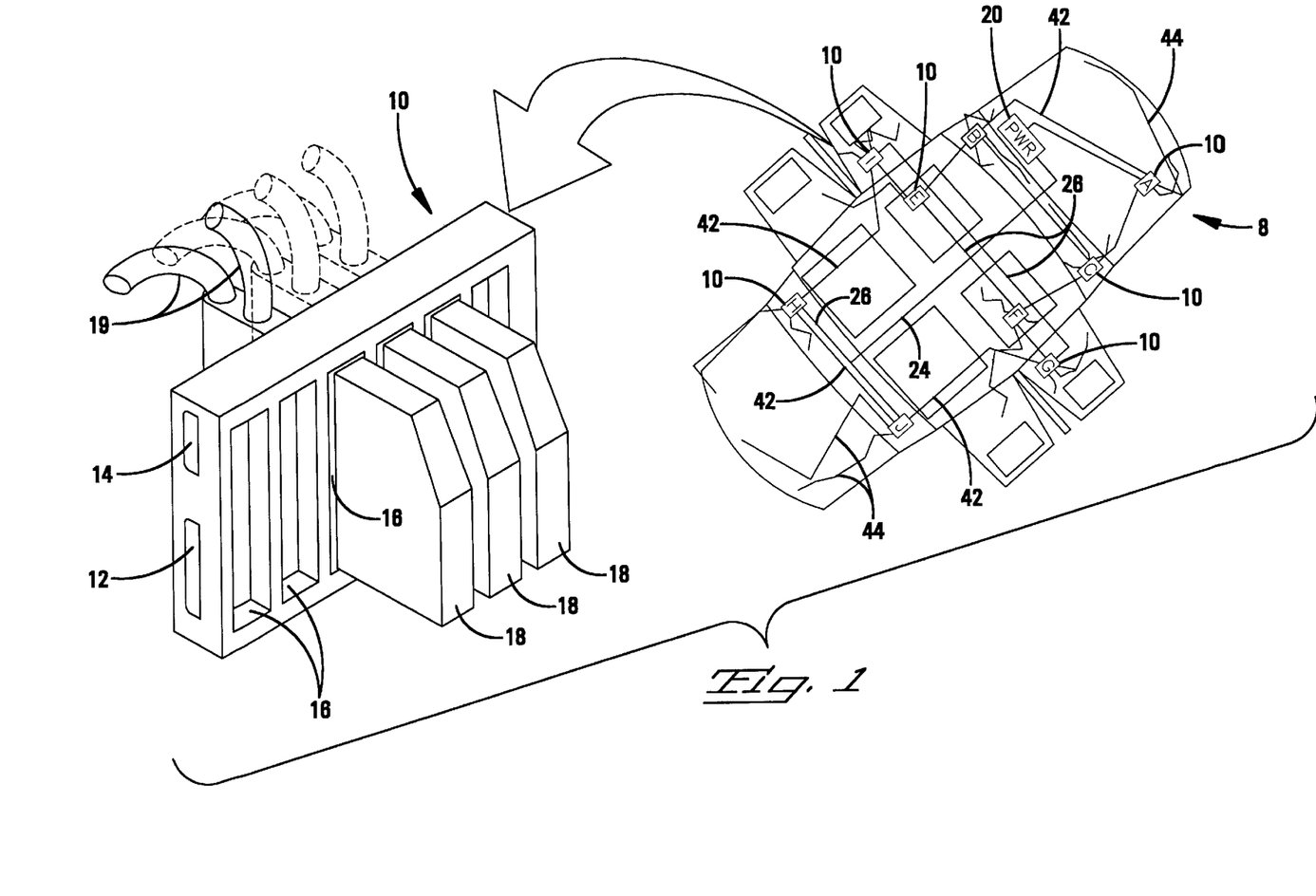
FIG. 1 shows the area and feature modules of the present invention which will be distributed throughout the automobile.

FIG. 1 shows the area and feature modules of the present invention and their distribution throughout the automobile 8. The area modules are to be installed throughout the automobile in different locations. The individual features or functions which are to be installed into the automobile can then be added onto the area module.

The area module 10 includes a connection point 12 for the low power power bus and also a connection point 14 for the network bus. The area module 10 could have separate connection points for providing both the input and the output of both the power and the network buses, not shown. Alternatively, the connection points can be integral to provide both input and output from the same connection point.

The area module 10 includes several bays 16 for receiving individual feature modules 18. These bays are designed in a uniform fashion having uniform connection points or electrical connectors so that any of the feature modules 18 can be installed into any of the individual bays. The area module 10 provides connection from the network bus connection 14 and the low power bus connection 12 to the individual bays 16 and therefore to any feature modules 18 that are inserted therein. The area modules contain; semiconductor logic for implementing, for example, the SAE J-1850 or CAN Protocol; the I/O interface cables 19 for the individual feature modules, and low power distribution bus for providing power to low current loads and to the individual feature modules.

The I/O cables 19 with connectors, provide electrical connection of both signal and power to and from the switches, sensors, loads and actuators. The feature module contains, for example, ROM based instructions specific to the module functions, and smart power drivers for low current loads.

Depending on the position of the area module 10 within the car, the appropriate feature modules 18 can be inserted into the area module into an individual bay 16. For instance, if the area module is located near the drivers seat, feature modules for the power windows, door locks, power mirrors, power seats would all be installed within that area module since virtually all I/O functions for those features are relatively close to the drivers seat. Therefore, judicious placement of the area modules could result in short and simple I/O cabling for virtually all features.

The feature modules 18 all have the same connection points or a standard electrical connector for mounting within the bay 16 on the area module 10. This allows the feature module 18 to be inserted at any position within the area module 10. The feature module 18 would have the electrical connections to all components which are associated with the individual feature. For example, the power window module would have inputs from the switches allowing the driver side door to provide a signal to the module indicating that the window should be moved up or down. The module would then provide power to the window motor to enable the window to be raised up or down based on the signal from the switch.

FIG. 1 also shows a layout of individual area modules 10 within the automobile. The signal and power distribution system will now be described. Power and signal would be distributed throughout the automobile on a network as shown. For example, power would be distributed from the fuse box 20 mounted within the engine compartment first to the area module marked A, along the power conductor 24. Power would also be distributed through the center of the automobile along conductor 24, and then to area modules B–J by way of tap conductors 26.

In addition to the power distribution network, the network (signal) bus will extend throughout the car along conductor 42. For instance, the signal distribution network extends from area module A to module B, E, D, H, J, G, F, C and back to A, therefore allowing signals to be transmitted between the individual area modules. For instance, if a signal is received within the area module marked D, which is received within the front driver side door, to indicate that all of the power door locks should be locked, area module D would send out a signal along the signal distribution network 42 to area module E, F, and G to the door lock features within those area modules which would then provide power via the I/O cables to lock or unlock the door. This allows the signal for the power locks to be transmitted across the signal network to the individual area modules rather than having a cable running from the door lock switch to each of the individual doors. This allows the number of wires within the automobile to be reduced in number, length and wire gage since they extend only to devices in the immediate vicinity of the area modules.

Extending from each of the area modules 10, are local distribution conductors 44 to provide signal and power to low power loads and switches and sensors within the vicinity of the area modules 10.

Currently, only one voltage of power, 12 volts, is distributed throughout the automobile. In the future, the use of dual voltages may become important. The power distribution network shown in FIG. 1 can be used for either distributing a single voltage, or alternatively, it can be used to distribute dual voltages.

Figure 2:
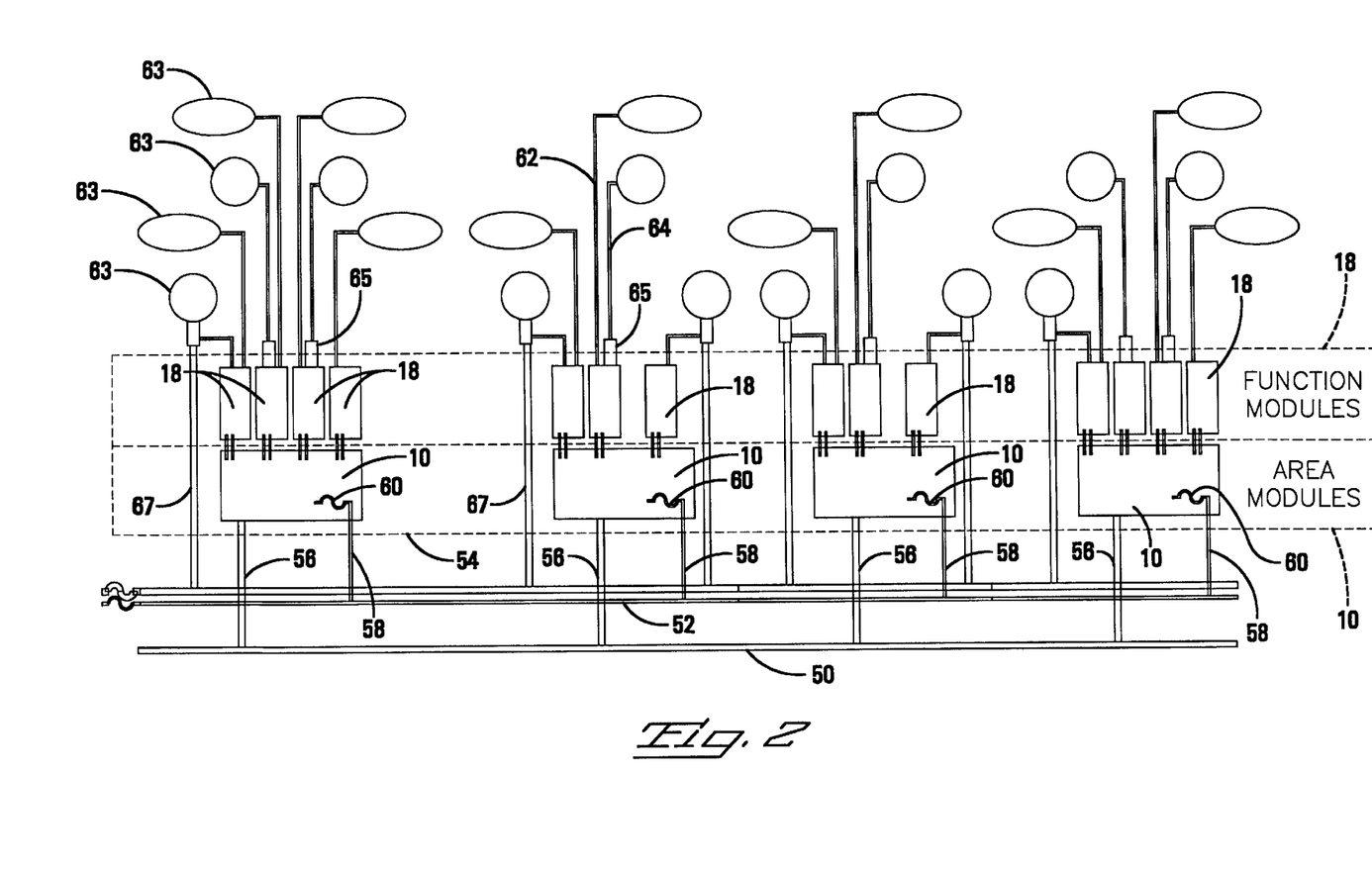
FIG. 2 shows the distribution and connection points between the area modules within an automobile schematically.

FIG. 2 shows a schematic of the power distribution and signal distribution used in the present invention. FIG. 2 illustrates the distribution network having dual voltages, however, a similar network could be setup where in only one voltage is installed within the automobile.

The distribution network has a signal network 50 which is a bus distribution signal, a low voltage power distribution network 52, and a high voltage power distribution network 54. The low voltage distribution provides 12 volt to the individual area module, and the high voltage distribution network provides 36 volts to high power loads without going through the area modules. Taps 56, 58 extend from the signal network 50 and the low voltage power distribution network 52, to the area modules 10.

Figure 3:
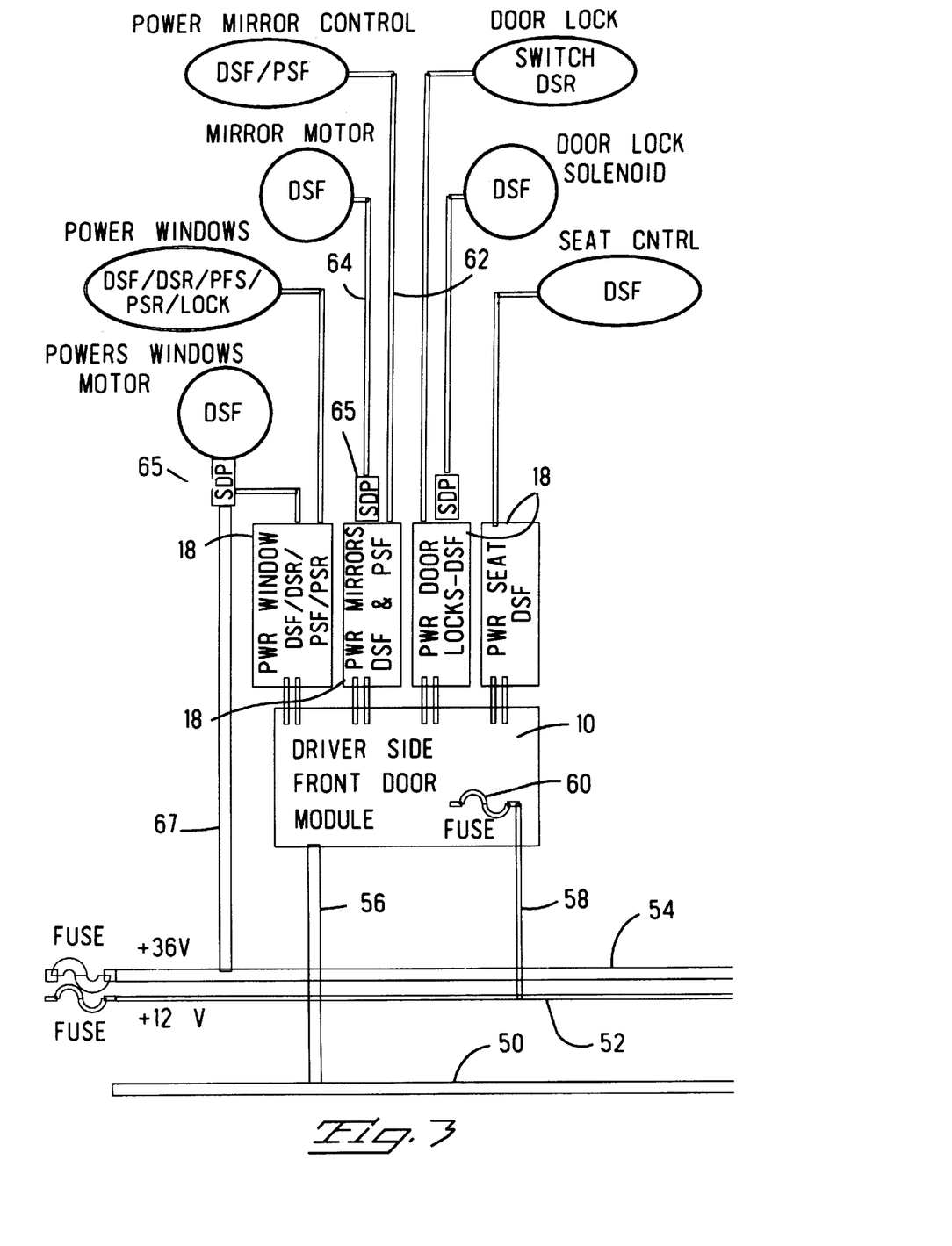
FIG. 3 shows the distribution network for the driver side front door module.
Figure 4:
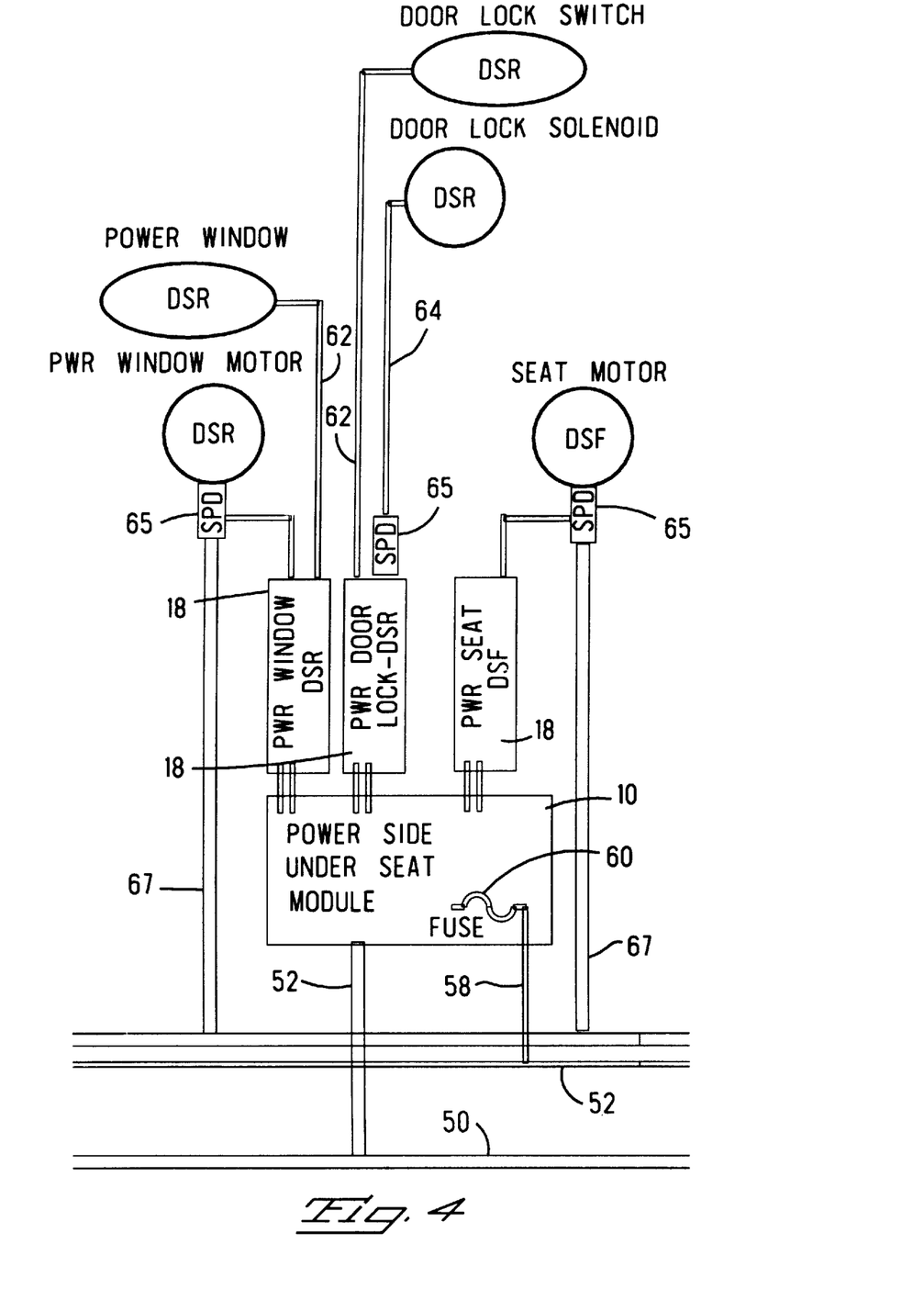
FIG. 4 shows the distribution network for the driver side under seat module.
Figure 5:
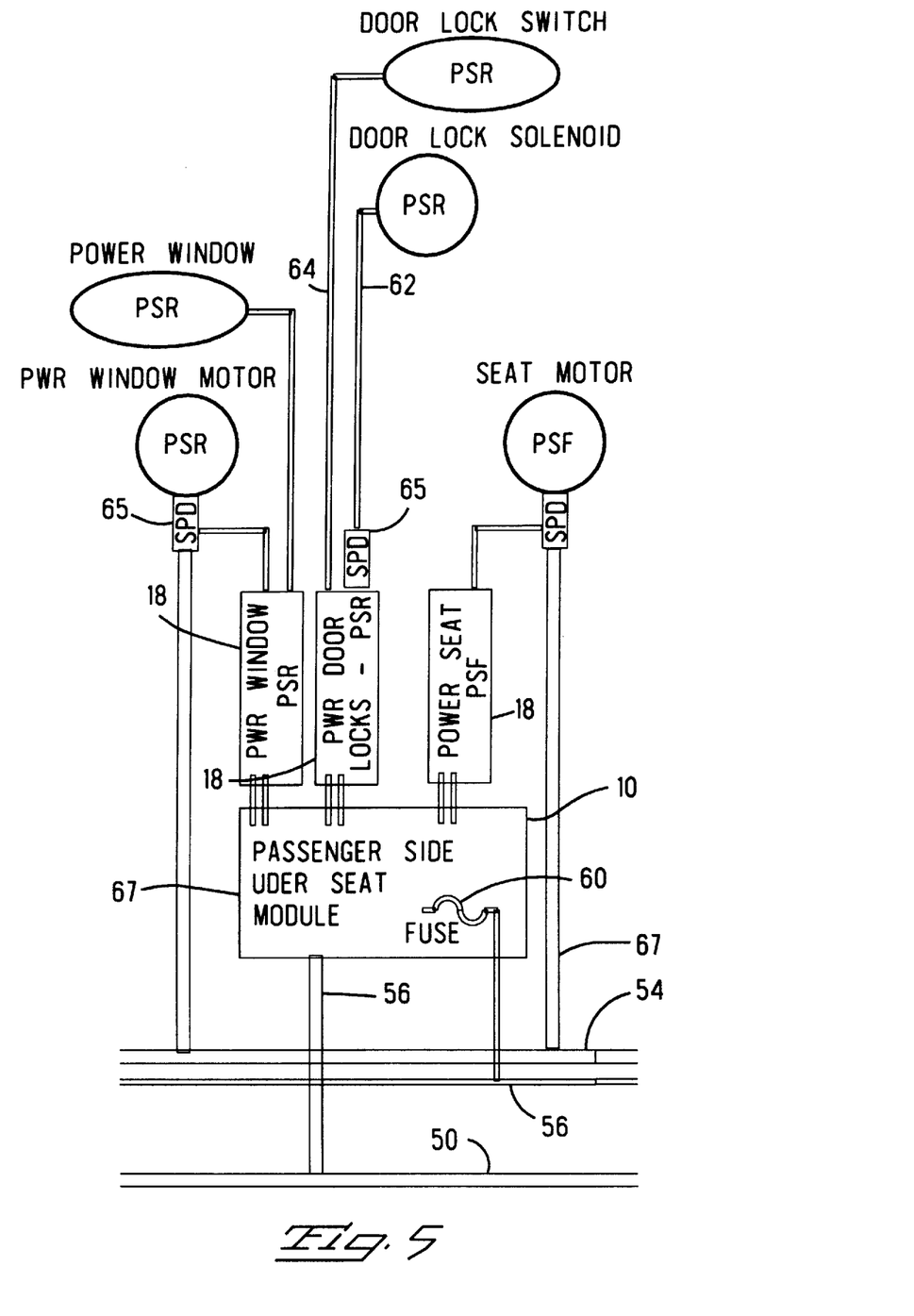
FIG. 5 shows the distribution network for the passenger side under seat module.

For example, the individual area modules 10 are distributed along the network, as shown in FIG. 3, wherein there is a driver side module, a driver side under seat module, a passenger side under seat module, and a passenger side front door module. Only four area modules are shown for illustration purposes, however it is to be understood that additional area modules can be used throughout the automobile to provide additional functions. The signal distribution 50 is connected to each of the individual area modules as shown in FIG. 3. Furthermore, each of the area modules are connected to the low voltage power distribution network, and typically have a fuse 60 between the power network and the area modules to protect the wiring in the event of an over-current condition in the module.

FIG. 2 shows the distribution of several area modules along the power and signal distribution network. FIGS. 3–6 show the details of the individual area modules 10 and their connection to individual functions within the automobile.

Connected to each of the area modules 10 are individual feature modules 18. For instance, connected to the driver side front door module are the power window, power mirrors, power door locks, and power seat feature modules 18, see FIG. 3. From the feature modules, there are extending either signal lines 62 or power lines 64 depending on the needs of the individual functions. The signal and power lines 62, 64 extend to individual functions 63 distributed throughout the automobile. FIG. 2 shows the layout of the whole network distribution and FIGS. 3–6 show the details of the individual area modules and the components connected thereto.

For example, the power window of the driver side front door provides a signal connection between the feature module and the power window switch, see FIG. 3. Furthermore, there is an additional connection between the power window and a smart power device (SPD) 65 which is attached to the power window motor. In this particular example, the power is supplied to the power window motor by way of the high voltage distribution network which is supplied to the smart power device. The smart power device 65 is activated by the signal received from the feature module. An alternative arrangement is shown in the power mirror feature module. The power mirror feature module has one connection which is connected to the power mirror control. Also the power mirror has its own smart power device 65 to distribute power from the feature module to the mirror motor. The power distribution is slightly different for those functions that require higher voltage from those that require the lower voltage. The lower voltage is shunted through the individual area modules, through the feature modules and by way of the smart power device to the individual function. However, if the function requires the high voltage, it will have an individual connection 67 between the high voltage power distribution network and the function. Since smart power devices will usually be located at the load, it is not necessary to connect the high voltage bus to the area module.

Figure 6:
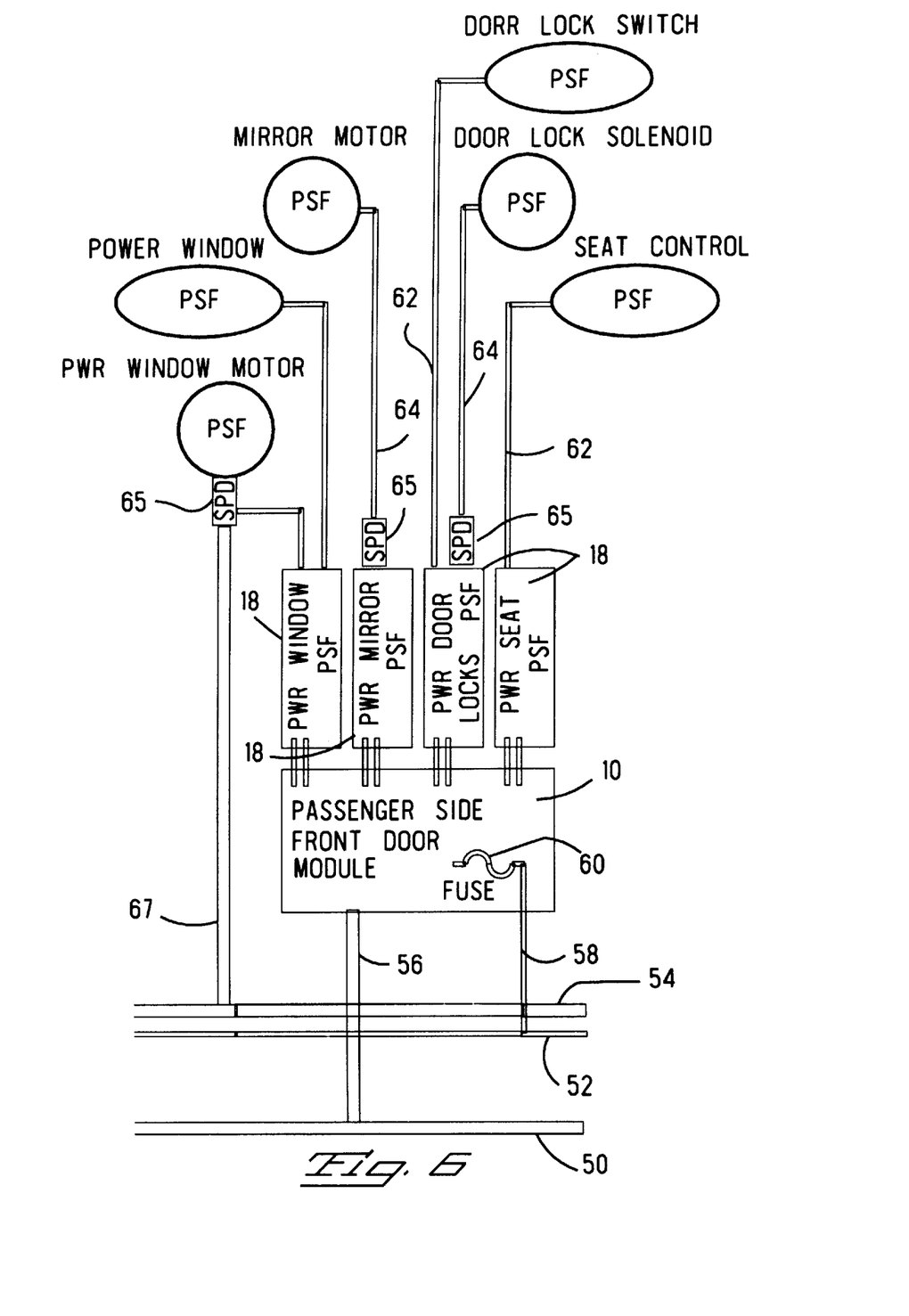
FIG. 6 shows the distribution network for the passenger side front door module.

Furthermore, as indicated under the power mirror feature module, the power mirror has controls for the mirrors in both the driver's side front door module and also the mirrors that are distributed off of the passenger side front door module. If a signal is received from the power mirror switches, it will be sent into the feature module 18, the feature module 18 will then send it through the area module 10, across the signal distribution network 54 to the passenger side front module. The power mirror feature module will then distribute power to the mirror motor by activating the smart power device. In this way signals can be sent throughout the car on the signal distribution network without needing individual wires for each signal path.

Figure 7:
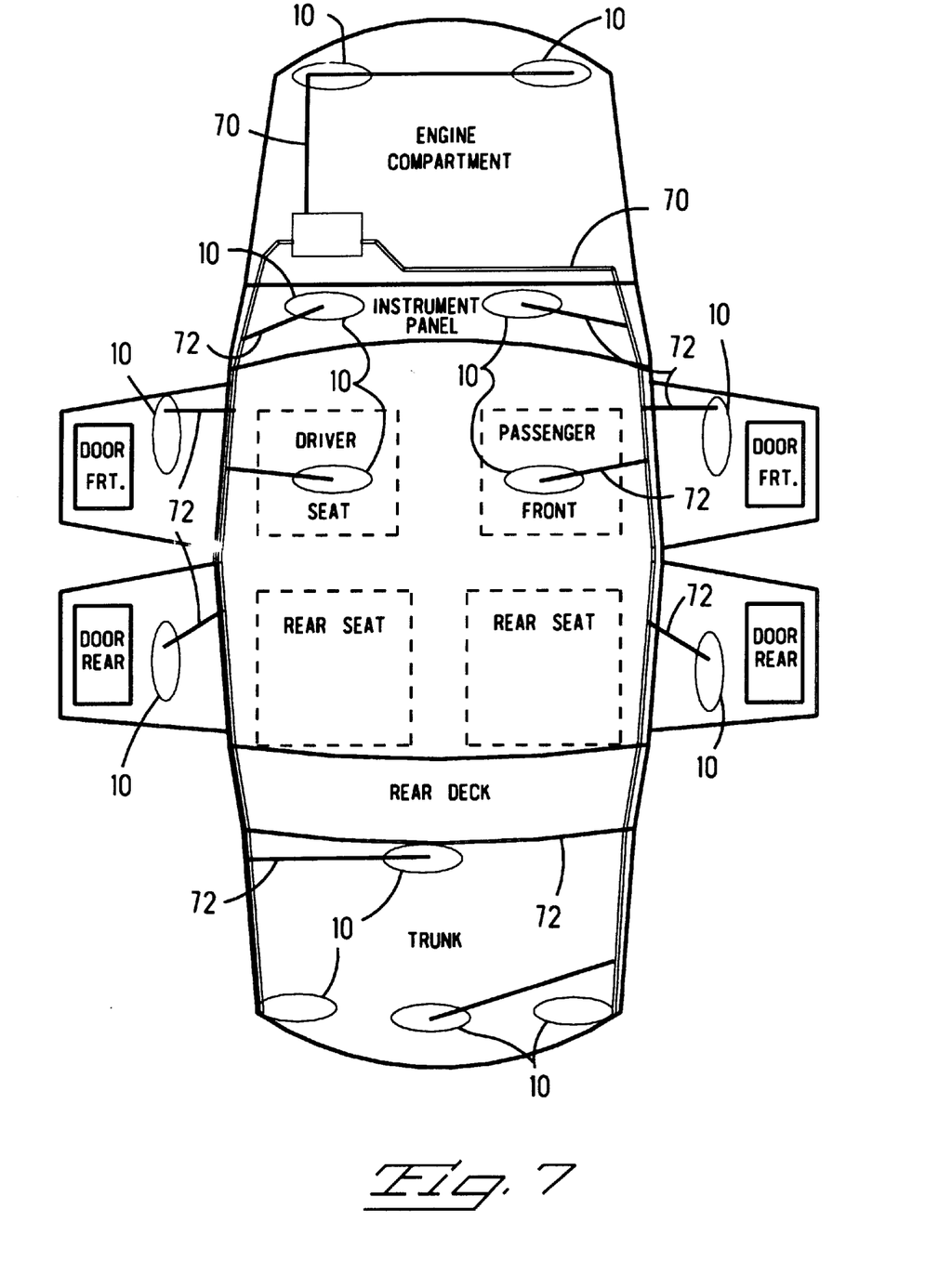
FIG. 7 shows a distribution for the power distribution bus.
Figure 8:
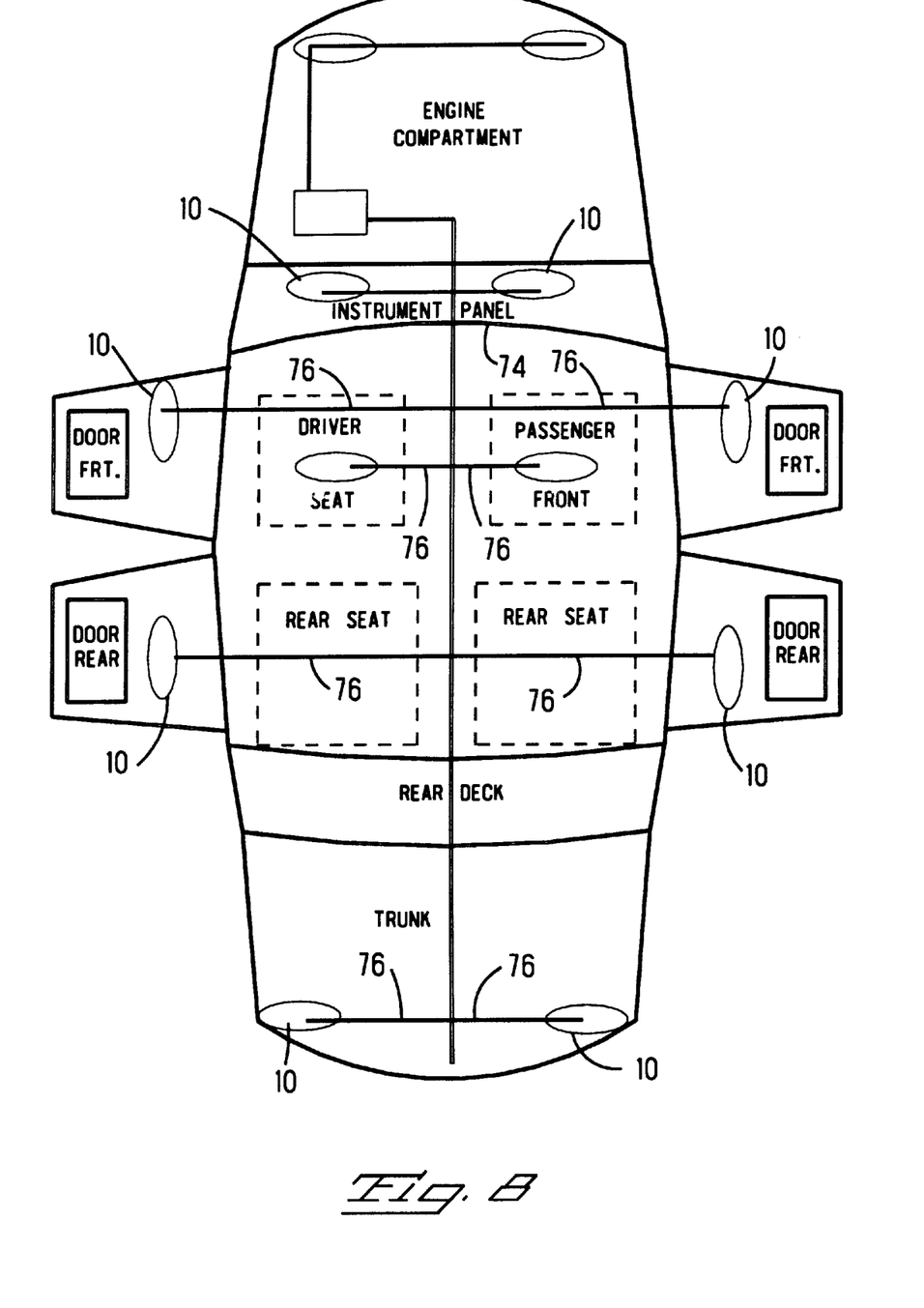
FIG. 8 shows an alternative power distribution layout.

FIG. 7 shows an alternative distribution network for the dual voltage distribution. The power distribution bus 70 is distributed throughout the periphery of car and the individual electronic modules and electrical loads for the individual functions will be tapped off from these buses by way of taps 72. An alternative distribution system is shown in FIG. 8 wherein the power distribution 74 is disposed centrally throughout the car and taps 76 are received off of the central bus.

Figures 9, 10:
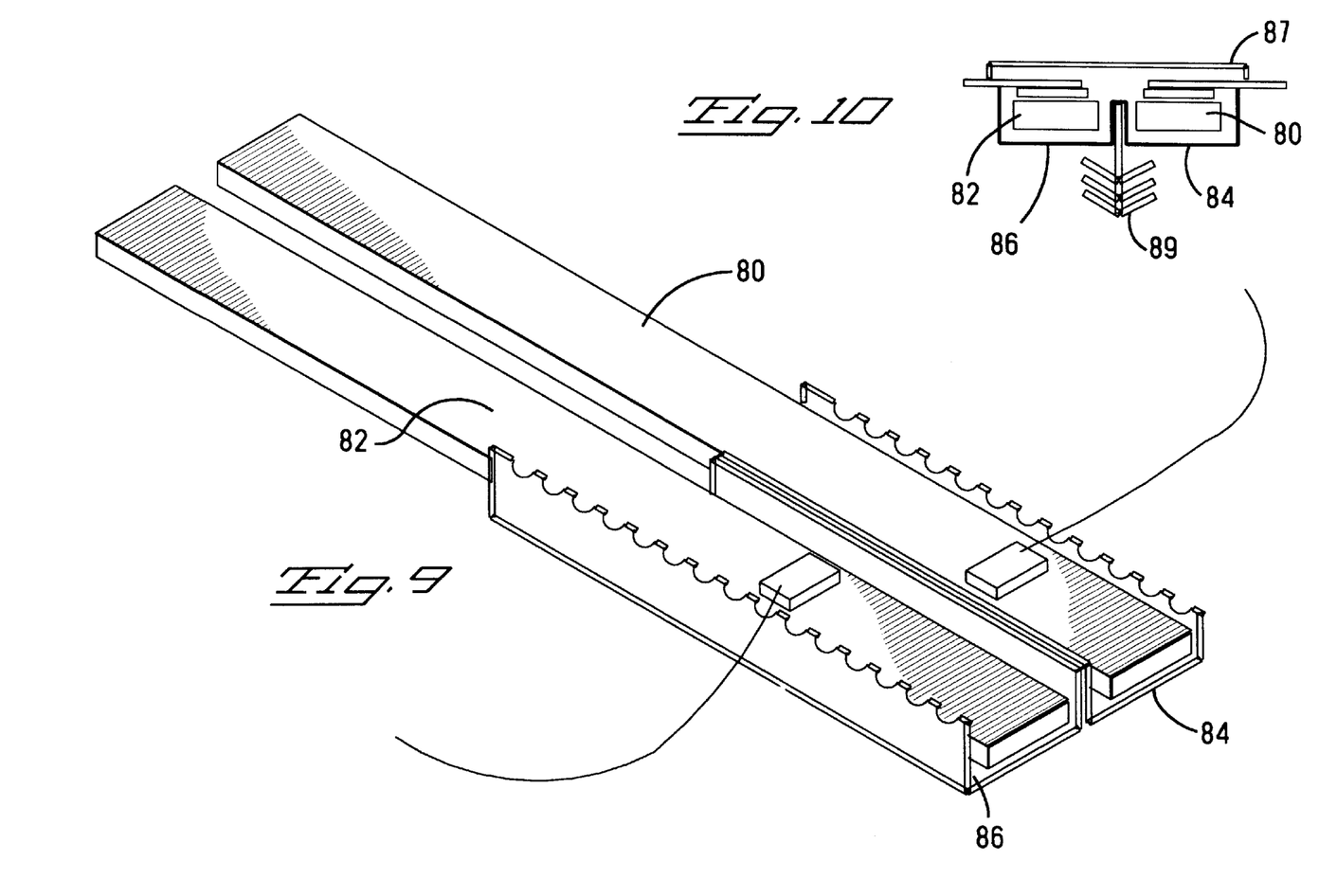
FIG. 9 shows the layout of the power distribution busses within the automobile
FIG. 10 shows a cross sectional view of the power distribution busses within the automobile.

FIG. 9 shows how the central power distribution bus would be arranged within the central portion of the car. The power would be distributed across a cable 80, 32, such as Wave Crimp (AMPOWER Wave Crimp System) supplied by AMP Incorporated, each of which are housed within a channel 84, 86 within the automobile. Electrical connection can then be made to the cable by way of a wave crimp having an attachment for a wire which can then by fed to the area modules. The cable channel is semi rigid to protect the cable and contains the attachments for the electrical connections therein and protects them. The cable channel also has a cover 87, see FIG. 10, received thereover to protect the distribution bus and the electrical connections. The cable channel will also have an anchor 89 to secure the channel to the automobile.

Figure 11:
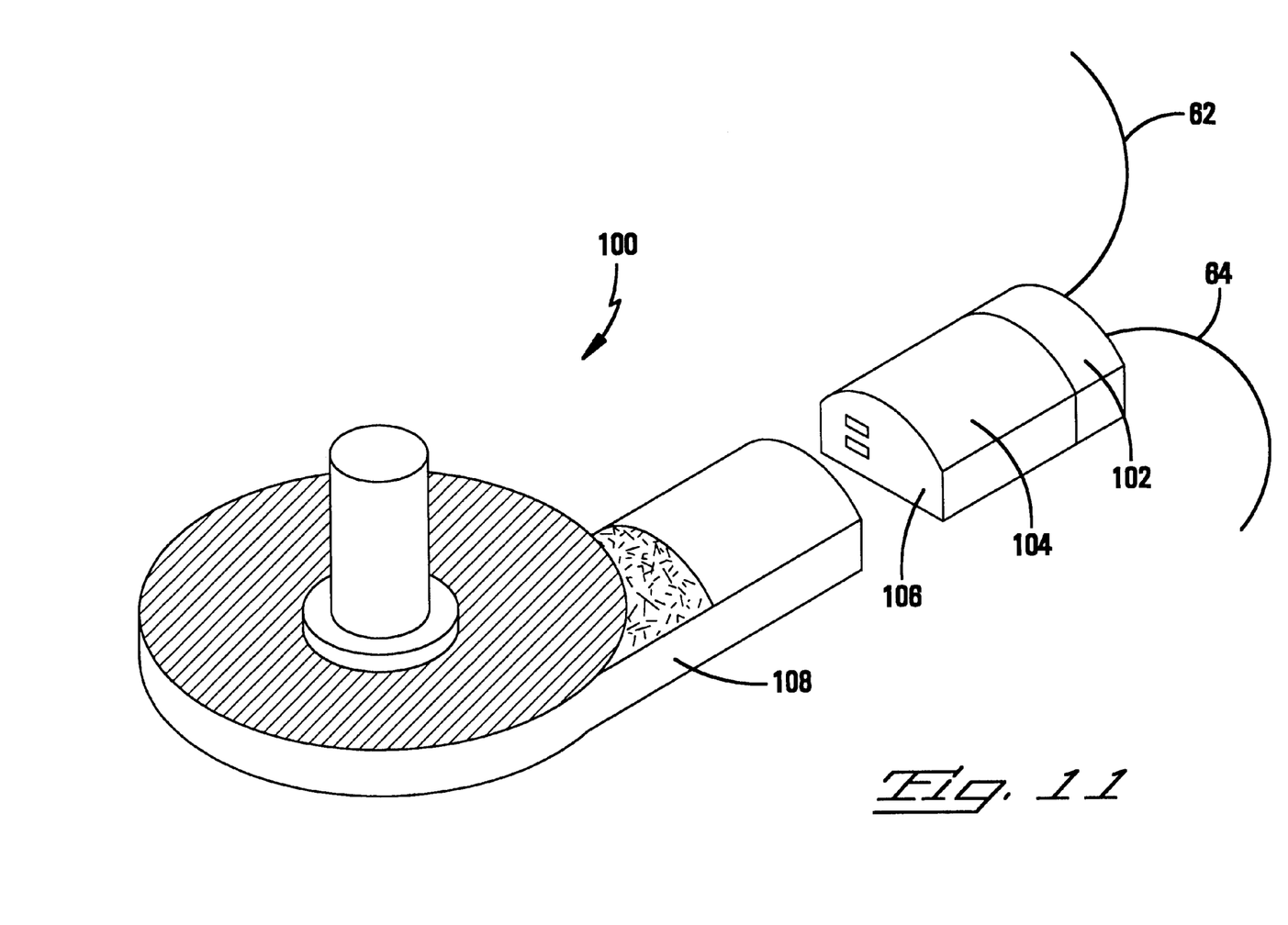
FIG. 11 shows the smart power connector of the present invention.

FIG. 11 shows an example of a smart power connector 100 for the high power loads. The smart power connector 100 includes an input connector 102 to receive both the signal 62 and power 64 therein. A second portion includes a replaceable smart power module 104 which contains a smart power silicon device and heat plug for heat spreading. This allows the power to be turned on and off to a device based on signal received with the smart power connector. The smart power connector has a plug 106 for connecting with the existing motor connector 108 and this in turn is connected to the motor or other device for which power is being supplied.

The advantages of the invention are that power and signal distribution networks eliminate numerous long cable distribution networks within the automobile and use short cables extending from centralized locations. A further advantage of the design is that virtually any size or model vehicle can be accommodated using the appropriate numbers of area modules populated with the required feature modules. The feature modules can be manufactured, tested, installed, maintained and replaced more easily and economically than fully integrated control modules now in automobiles. Feature improvements can be made by changing only the design of the feature module. A further advantage is that dual voltage power distribution for high and low current loads uses a flexible system which minimizes heavy gage wiring contained in present automotive applications.

The distribution network and the area and feature modules of the present invention and many of their attendant advantages will be understood from the foregoing description. It is apparent that these changes may be made in the form, construction, and arrangement of parts thereof without departing from the spirit or scope of the invention, or sacrificing all of their material advantages.

What is claimed is:

1. An electrical distribution system for
    automobile, comprising:
    a power, distribution bus;
    signal distribution bus;
    an area module having an electrical connection with the power distribution bus and the signal distribution bus, the area module having connections to individual feature modules, the feature modules having power and signal distribution for electrical components, the area and the feature modules distributing power and signal to the electrical components from the power distribution bus and the signal distribution bus, wherein the power distribution bus provides low voltage power to the area modules and a high voltage power bus provides high voltage power to individual components.

2. The electrical distribution system of claim 1, wherein a plurality of area modules are distributed along the signal distribution bus, each of the area modules being connected to the signal distribution bus.

3. The electrical distribution system of claim 2, wherein each of the area modules are electrically connected to the power distribution bus.

4. The electrical distribution system of claim 1, wherein the feature modules have local distribution cables to provide signal and power to local components.

5. The electrical distribution system of claim 4, wherein a smart power device is disposed along the local distribution cables which supply power to the local components.

6. The electrical distribution system of claim 1, wherein high voltage power taps extend from the high voltage power bus to the components which require high voltage, a smart power device being disposed between the components which require high voltage and the high voltage power taps.

7. An electrical distribution system for a vehicle, comprising:
    an electrical component;
    a power distribution bus;
    a signal distribution bus;
    an area module having an electrical tap to the power distribution bus and to the signal distribution bus, the area module distributing a signal to and from the signal distribution bus to the electrical component and distributing power to the electrical component in response to a signal, wherein the power distribution bus provides low voltage power to the area modules and a high voltage power bus provides high voltage power to individual components.

8. The electrical distribution system of claim 7, wherein feature modules are connected to the area module to provide electrical connection for the signal and the power to and from the electrical component.

9. The electrical distribution system of claim 8, wherein a plurality of area modules are distributed along the signal distribution bus, each of the area modules being connected to the signal distribution bus.

10. The electrical distribution system of claim 9, wherein each of the area modules are electrically connected to the power distribution bus.

11. The electrical distribution system of claim 7, wherein the feature modules have local distribution cables to provide signal and power to local components.

12. The electrical distribution system of claim 11, wherein a smart power device is disposed along the local distribution cables which supply power to the local components.

13. The electrical distribution system of claim 12, wherein high voltage power taps extend from the high voltage power bus to the components which require high voltage, a smart power device being disposed between the components which require high voltage and the high voltage power taps.

14. An electrical distribution system for an automobile, comprising:

a signal distribution network having a backbone and a plurality of taps;

a power distribution network having a backbone and a plurality of taps;

a plurality of area modules being connected to the taps on both the signal distribution network and the power distribution network for receiving signal and power, each of the area modules providing and receiving signal to and from various electrical components within the vicinity of each of the area modules, and each area modules providing power to the various electrical components based on the signals received, wherein a power distribution bus provides low voltage power to the area modules and a high voltage power bus provides high voltage power to individual components.

* * * * *